United States Patent [19]
Feldman et al.

[11] Patent Number: 5,249,195
[45] Date of Patent: Sep. 28, 1993

[54] ERBIUM DOPED OPTICAL DEVICES

[75] Inventors: Leonard C. Feldman, Berkeley Heights; Neil E. J. Hunt, Scotch Plains; Dale C. Jacobson, Hackettstown; John M. Poate, Summit; Erdmann F. Schubert, New Providence; Arjen M. Vredenberg, North Plainfield; Yiu-Huen Wong, Summit; George J. Zydzik, Columbia, all of N.J.

[73] Assignee: AT&T Bell Laboratories, Murray Hill, N.J.

[21] Appl. No.: 906,910

[22] Filed: Jun. 30, 1992

[51] Int. Cl.⁵ .................................. H01S 3/19
[52] U.S. Cl. ........................... 372/45; 372/49; 372/96; 372/99
[58] Field of Search ............ 372/45, 96, 99, 49

[56] References Cited

U.S. PATENT DOCUMENTS

| | | | |
|---|---|---|---|
| 4,943,970 | 7/1990 | Bradley | 372/45 |
| 4,975,922 | 12/1990 | Sakane et al. | 372/49 |
| 4,999,842 | 3/1991 | Huang et al. | 372/45 |
| 5,039,190 | 8/1991 | Polman et al. | 359/341 |
| 5,045,897 | 9/1991 | Ahlgren | 372/45 |
| 5,052,008 | 9/1991 | Kemeny | 372/96 |
| 5,146,465 | 9/1992 | Khan et al. | 372/45 |

FOREIGN PATENT DOCUMENTS 0126488 10/1979 Japan ..................... 372/49

OTHER PUBLICATIONS

W. J. Miniscalco, "Erbium-Doped Glasses for Fiber Amplifiers at 1500 nm", *Journal of Lightwave Technology*, vol. 9, No. 2, Feb. 2, 1991, pp. 234-249.

A. Polman et al., "Optical Doping of Waveguide Materials by MeV Er Implantation" *Journal of Applied Physics*, vol. 70, No. 7, Oct. 1, 1991, pp. 3778–3784.

V. P. Gapontsev et al., "Erbium glass lasers and their applications", *Optics and Laser Technology*, Aug. 1982, pp. 189-196.

*Primary Examiner*—Georgia Y. Epps
*Attorney, Agent, or Firm*—Oleg E. Alber

[57] ABSTRACT

This invention embodies an optical device with a Fabry-Perot cavity formed by two reflective mirrors and an active layer which is doped with a rare earth element selected from lanthanide series elements with number 57 through 71. The thickness of the active layer being a whole number multiple of $\lambda/2$ wherein $\lambda$ is the operating, or emissive, wavelength of the device, said whole number being one of the numbers ranging from 1 to 5, the fundamental mode of the cavity being in resonance with the emission wavelength of said selected rare earth element. Cavity-quality factors exceeding $Q=300$ and finesses of 73 are achieved with structures consisting of two $Si/SiO_2$ distributed Bragg reflector (DBR) mirrors and an Er-implanted ($\lambda/2$) $SiO_2$ active region. The bottom DBR mirror consists of four pairs and the upper DBR mirror consists of two-and-a half pairs of quarterwave ($\lambda/4$) layers of Si and $SiO_2$. Photoluminescence at room temperature reveals a drastic enhancement of the luminescence intensity of the cavity emitted along the optical axis of the cavity versus the luminescence without the top mirror. The luminescence intensity of the cavity is typically 1-2 orders of magnitudes higher as compared to structures without a cavity. Furthermore, since the emission wavelength and the intensity decrease for off-normal emission angles, the change in emission wavelength can be quantitatively described by assuming that the on-axis component of the optical wave is resonant with the cavity.

28 Claims, 4 Drawing Sheets

ERBIUM DOPED OPTICAL DEVICES

FIELD OF THE INVENTION

This invention pertains to optical devices having a rare earth element-doped active region within a Fabry-Perot cavity, and especially to devices having an Erbium-doped active region.

BACKGROUND OF THE INVENTION

The incorporation of rare earth ions of lanthanide series of elements with numbers ranging from 57 to 71 of the Mendeleev's periodic system in glasses has led to the development of optical fiber lasers and amplifiers. Current interest is directed towards erbium-doped fibers for the fabrication of optical fiber amplifiers at 1.5 $\mu$m signal wavelength. These fiber amplifiers are typically doped with Er at a concentration of 10-100 ppm. For the principle of fabrication and operation of such an amplifier see W. J. Miniscalco, "Erbium-Doped Glasses for Fiber Amplifiers at 1500 nm", *Journal of Lightwave Technology*, Volume 9, No. 2, Feb. 2, 1991, pp. 234-249. Recently it was established by A. Polman et al., that planar waveguides and amplifiers could be formed by implanting Er into thin $SiO_2$ films at concentrations of $10^2$-$10^4$ ppm. The guides were typically 2 $\mu$m thick, 5 $\mu$m wide and 5 cm long. See A. Polman et al., "Optical Doping of Waveguide Materials by MeV Er Implantation", *Journal of Applied Physics*, Vol. 70, No. 7, Oct. 1, 1991, pp. 3778-3784, and U.S. Pat. No. 5,039,190 issued to A. Polman et al., on Aug. 13, 1991, which are incorporated herein by reference. A. Polman et al. demonstrated that Er can be incorporated in thin films of transparent waveguide materials using MeV implantation. Implantation doping of, for example, $SiO_2$, phosphosilicate glass, and $Si_3N_4$ with Erbium ion by Polman et al., in films of transparent waveguide materials using MeV implantation resulted in sharply peaked photoluminescence spectra centered around 1.5 $\mu$m with lifetimes up to 15 ms. The operation of optical amplifiers depends on stimulated emission from the 1.5 $\mu$m excited state of Er, and the efficiency of amplification will depend upon the lifetime of spontaneous emission rate from that level.

Besides planar waveguide lasers and optical amplifiers, there is a potential interest for planar light-emitting devices which do not rely on an optical gain, or stimulated emission, principle. Erbium as the active element would be the most promising choice for devices operating in the 1.5 $\mu$m region because of its 1.5 $\mu$m optical transition between intra-4f electronic states, which are only slightly perturbed by the surrounding host. Although non-planar 1.5 $\mu$m light-emitting devices, such as optical fiber lasers, can advantageously be used in a variety of communications systems, there are many potential applications for light-emitting devices for which non-planar devices are not readily or conveniently adapted. For instance, it would be desirable to integrate a light-emitting device with electronic and opto-electronic devices or structures, since such integration is expected to result in decreased cost, increased ruggedness and possibly greater speed. Such integration would be facilitated by the availability of an efficient planar 1.5 $\mu$m light-emitting device. Furthermore, the availability of such devices would significantly advance progress toward fully integrated optics; these devices can be expected to be desirable replacements for non-planar devices, due to their more compact nature and increased mechanical stability, and are likely to find an application in lightwave communications systems.

SUMMARY OF THE INVENTION

This invention embodies an optical device with a Fabry-Perot cavity formed by two reflective mirrors and an active layer which is doped with a rare earth element selected from lanthanide series elements with numbers 57 through 71. The thickness of the active layer being a whole number multiple of $\lambda/2$ wherein $\lambda$ is the operating, or emissive, wavelength of the device, said whole number being one of the numbers ranging from 1 to 5, the fundamental mode of the cavity being in resonance with the emission wavelength of said selected rare earth element.

In a specific example of the invention a Fabry-Perot microcavity, grown on a Si substrate, consists of two $Si/SiO_2$ distributed Bragg reflectors and an Er-doped $SiO_2$ active region. Er is incorporated into the center $SiO_2$ layer of the cavity. The fundamental mode of the cavity is in resonance with the 1.55 $\mu$m emission of a 4f electronic transition of $Er^{3+}$ atoms in $SiO_2$. The emission characteristic from an Er-doped $SiO_2$ active region in the microcavity is drastically changed, including the spontaneous emission intensity and the spectral purity, as compared to a no-cavity structure. Control over the 1.5 $\mu$m emission from Er is effected by the excitation of Er.

DETAILED DESCRIPTION

The applicability of planar light-emitting devices greatly depends on the efficiency of the light output defined, for instance, as the ratio of the output light power measured along the normal to the light-emitting surface of the device and of the optical power needed to pump the device, and on the spectral purity of the device. Both the efficiency and the spectral purity depend for an important part on the coupling of the excited rare earth ions to the optical modes into which photons can be emitted. Hence, control and, thus, improvement of efficiency and spectral purity of devices comprising a selected rare earth as an active element could be realized by control of the available optical modes and the coupling to photons which are spontaneously emitted from excited rare earth ions.

It has long been recognized that the spontaneous emission rate of an atom can be modified when it is placed in an optical cavity. This is brought about by a resonant coupling of atoms with a single field mode of the cavity. The first demonstration of this effect came in the microwave region by using beams of atoms in Rydberg states. Advances in recent years in semiconductor heterostructure fabrication have permitted the construction of resonant microcavities where changes in electroluminescent lifetime and intensity have been observed.

Figure 1:
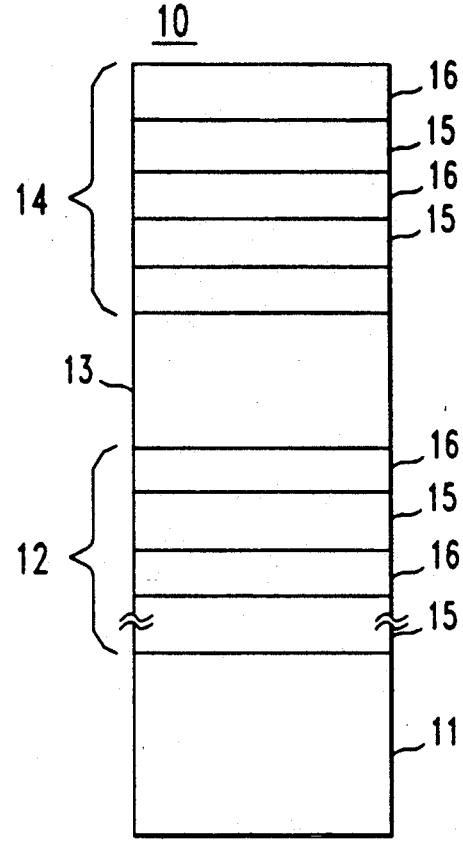
FIG. 1 discloses a schematic structure of an exemplary $Si/SiO_2$ resonant cavity structure grown on an Si substrate.

Shown in FIG. 1 is a schematic representation of an optical device, 10, capable of spontaneous light emission. Device 10 includes in an ascending order a substrate, 11, a bottom reflector mirror, 12, an active layer, 13, and a top reflector mirror, 14. The substrate may be of a number of materials being used in the intergated circuits, such as semiconductors, glasses, ceramics, etc. Si would be especially useful, since many integrated circuits are grown on Si substrates.

Active layer 13 is of a material, which when subjected to light excitation, is either not capable of spontaneous luminescence or whose luminescence is of such minor value as not to be considered as being emissive. Glasses such as $SiO_2$, phosphosilicate glass, borosilicate glass, borophosphosilicate glass, boronaluminum silicate glass, germanate glass, tellurite glass, fluoride glass and such glass-like materials as oxides, e.g. $Al_2O_3$, or nitrides, e.g. $Si_3N_4$, belong to the former, while tetrahedrally bonded semiconductor materials, such as Si, Ge, GaAs, InP, GaInAs, GaInPAs, semiconductor materials such as ZnS, ZnSe, and conductive oxides such as $CdSnO_3$ and $InSnO_3$, belong to the latter.

Figure 2:
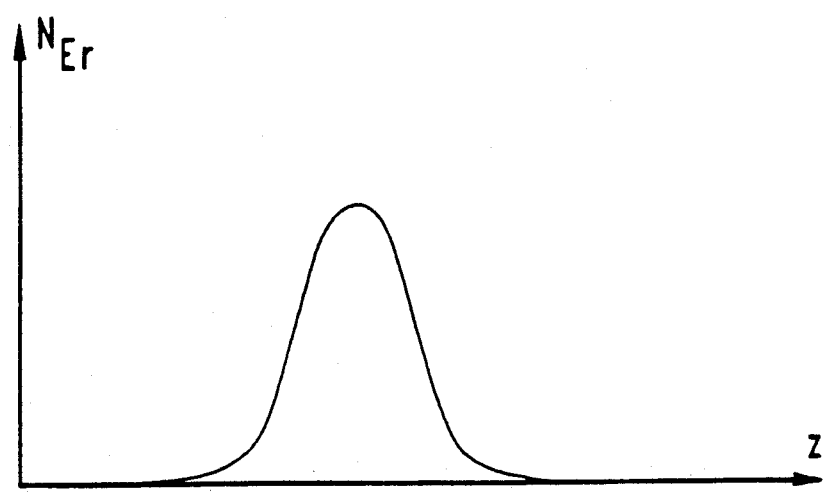
FIG. 2 discloses a schematic representation of an Er-implantation profile in the resonant cavity shown in FIG. 1.

Active layer 13 is doped with ions of rare earth elements of lanthanide series of elements with atomic numbers ranging from 57 to 71. Depending on the material of the active layer, the dopant may be incorporated in any well-known manner, such as by implantation or sputtering with subsequent annealing, or by MBE, CVD or OMVPE during the growth of the active layer. The important condition is that the majority of the ions be confined to the active layer, for example, as is represented in FIG. 2 of the drawings.

The thickness of active layer 13 is a whole number multiple of $\lambda/2$, with $\lambda$ being the operation, or emission, wavelength of the cavity. The whole number is selected from a range of from 1 to 5 to provide, in combination with mirrors 12 and 14, a resonant cavity for the spontaneous emission of the selected rare earth dopant.

Reflector mirrors 12 and 14 placed on opposite sides of active layer 13, form with the active layer a resonant Fabry-Perot cavity. The mirrors should be of a highly reflective material with reflectivity of at least 98 percent. Depending on the desired direction of emission, one of the mirrors is more reflective than the other, with emission taking place through a less reflective mirror. Both of these mirrors may be in the form of thin metal films, distributed Bragg reflectors (DBRs), layers of conductive semi-transmissive oxides, and suitable combinations of these. A metal may be selected from such metals as Ag, Au, Al, Cr and Cu. The DBRs are typically in the form of pairs of materials with different refractive index. These materials are selected from semiconductors, conductive oxides, glasses and glass-like oxides. The semiconductive materials may be selected from such tetrahedrally bonded semiconductor materials as Si, Ge, GaAs, InP, GaInAs, GaInPAs, semiconductor materials, such as ZnS,ZnSe, and conductive oxides, such as CTO and ITO. The glasses are selected from $SiO_2$, phosphosilicates, borosilicates and borophosphosilicates, boronaluminum silicates, germanates, tellurites and fluorides. The selected materials are arranged in pairs so that layers in each mirror adjacent to the active layer have an index of refraction which is higher than the index of refraction of the material of the active layer. For example, in the case of an active layer being of such material as $SiO_2$ (with $n \approx 1.5$) and the pairs of layers in the mirrors being of Si (with $n \approx 3.3$) and $SiO_2$, the layers are so arranged that layers with higher index of refraction (e.g. Si) are positioned adjacent to the lower index of refraction material e.g. ($SiO_2$) of the active layer.

The mirror with higher reflectivity is positioned opposite to the mirror with lower reflectivity, so that emission takes place through the latter. In case of a metal mirror, the thickness is selected to allow for sufficient transmitivity through the mirror. For example, for an effective Ag mirror, Ag is deposited in a thickness ranging from 50 to 500 Angstroms.

The DBR mirrors consist of a plurality of pairs of quarterwave layers, e.g. 15 and 16. For mirrors with pairs of the same two materials, the number of pairs in a bottom mirror 12 is greater than the number of pairs in top mirror 14. The thickness of each of layers 15 and 16 is equal to $\lambda/4$, wherein $\lambda$ is an operating, or emission wavelength of the device. Since layers 15 are of different material and have different refractive index than layers 16, layers 15 differ from layers 16 in thickness, also.

Glasses, when subjected to light excitation, normally do not produce spontaneous photoluminescence. Semiconductors may provide only minor spontaneous photoluminescence but at wavelengths which are not located at a desired preferred wavelengths. This deficiency is overcome by providing the glass material (or semiconductor) with ions which, upon being subjected to excitation with light, lead to a pronounced spontaneous luminescence. Thus, the active layer is doped with ions of at least one rare earth element of lanthanide series of elements with atomic members 57 to 71 of the Mendeleyev's Periodic Table. In such a device, the operating wavelength fully depends on the wavelength of emission from an implanted ion.

The present invention is described in greater detail with reference to a specific exemplary embodiment in which Erbium is the preferred rare earth element. Erbium is one of the rare-earth elements which are widely used in optical telecommunication technology because of its optical transistion at 1.5 $\mu$m which coincides with the minimum loss window in silica fibers.

In the specific exemplary embodiment, device 10 comprises Si substrate 11, bottom DBR mirror 12, Er-doped $SiO_2$ active region 13, and top DBR mirror 14. The bottom and top mirrors consist respectively of pairs of quarterwave layers 15 of Si($\lambda/4 \approx 1150$ Å), and quarterwave layers 16 of $SiO_2$($\lambda/4 \approx 2700$ Å). In the specific example, the bottom mirror consists of 4 pairs of layers 15 and 16, and the top mirror consists of $2\frac{1}{2}$ pairs of layers 15 and 16. The uppermost layer 16 of top mirror 14 acts as a capping layer. The layers in the bottom and the top DBR mirrors are deposited such that Si layers 16 of each mirror are adjacent to the active layer. The calculated reflectivities of the bottom and top DBRs are 99.8 percent and 98.5 percent, respectively. The active region has a thickness of 5400 Å corresponding to $\lambda/2$.

Si layers 16 are deposited by dc-magnetron sputtering at a rate of 125 Å/sec. and SiO$_2$ layers 15 are deposited by rf-magnetron sputtering at a rate of 30 Å/sec. The sputtering was conducted by tandem deposition using a Model No. 603 Sputtering System available from Materials Research Cooporation. Alternatively the Si and SiO$_2$ layers may be deposited by electron beam evaporation, for example, from side-by-side sources of the two materials, with a shutter interrupting the deposition, as needed. These layers may also be deposited by MBE or OMVPE, for example, in the case when both the layers of the mirrors and the active layer are deposited in one procedure.

The reflectivity of the fully grown structure, prior to the implantation of the rare earth ions, was measured using a tungsten halogen light source and an optical spectrum analyzer in order to verify the resonance wavelength of the cavity. Subsequently, an area of the top mirror was implanted through capping layer 16 with Er at a dose of $7.7 \times 10^{15}$ cm$^{-2}$ and an implantation energy of 3.55 MeV. The projected range of the implant into the structure is 1.15 μm, i.e., the maximum of the Er concentration occurs in the center of SiO$_2$ active region 13, as is represented in FIG. 2. The projected straggle of the implant is 2450 Å demonstrating that the implanted Er is mostly confined to the active region. Post-implantation anneal to correct any damage caused by Er ion implantation was carried out at 700°–900° C. for 30 minutes. Alternatively, the Er ion may be deposited on top of the active layer by sputtering or e-beam evaporation. Er may also be incorporated into the active layer during an MBE growth of the structure.

Photoluminescence measurements of the microcavity of the exemplary device were carried out at room temperature using a Ti/Sapphire laser tuned to an excitation wavelength of 980 nm. To make possible the comparison of structures with and without cavity on the same Er-implanted sample, the top mirror on some of the samples was removed by wet chemical etching. The employment of highly selective etchants allows for the selective removal of the top mirror only. An example of an etchant may be an HF or a BOE (buffered oxide HF etchant) which removes Si in preference to SiO$_2$. For other materials some other etchants may be selected as is well known in the art. Light emission through the top of devices with cavity can be greatly enhanced if the cavity resonance is at 1.55 μm, i.e., coinciding with the wavelength of the Er luminescence. These results can be understood from a model of the influence of an optical cavity on the atomic transition probability for spontaneous emission of excited Er$^{3+}$.

The spontaneous emission of photons due to electronic transitions in condensed matter systems depends on the characteristics of the initial and final electronic state and on the optical mode density. The spontaneous radiative recombination rate is given by:

$$W_{spont} = \tau_{spont}^{-1} = \int_0^\infty W_{spont}^{(l)} p(v_l) dv_l \quad (1)$$

where $W_{spont}^l$ is the spontaneous transition rate into an optical mode l and $p(v_l)$ is the optical mode density. In free space, the optical mode density is given by:

$$p(v_l) = 8\pi v_l^2 n^3 V/c^3 \quad (2)$$

where n, V and c are the refractive index, the volume of the medium, and the velocity of light, respectively. In free space, the optical mode density is a continuous function of the mode frequency $v_l$. This situation is changed drastically in one-dimensional Fabry-Perot cavities. In such cavities, the mode density is "quantized", i.e. only modes with specific frequencies can exist inside the cavity. For a one-dimensional cavity consisting of two coplanar reflectors, the wavelengths of the modes of the cavity are given by:

$$2L_z = N\lambda_l + \frac{\lambda_l}{2\pi} \phi_1(\lambda_l) + \frac{\lambda_l}{2\pi} \phi_2(\lambda_l) \quad (3)$$

where N is an integer and $\phi_1(\lambda_l)$ and $\phi_2(\lambda_l)$ are the phase shifts of the reflected wave incurred at the two reflectors of the cavity. The spectral broadening of the modes depends on the reflectivities of the two reflectors and on the cavity length and can be expressed, for example, by the uncertainty relation.

The resonance between the optical mode of the cavity and the emission wavelength of the Er is of critical importance. The emission from Er is due to a transition between atomic 4f levels which is, therefore, inherently narrow. However, the Er-emission lines are inhomogeneously broadened by the random local environment of Er atoms in the SiO$_2$ host. The Er emission occurs typically between 1500 and 1600 nm with two distinct maxima at 1535 nm and 1550 nm (see curve 52 in FIG. 5). It is necessary for the cavity to be in resonance at this regime.

Figure 3:
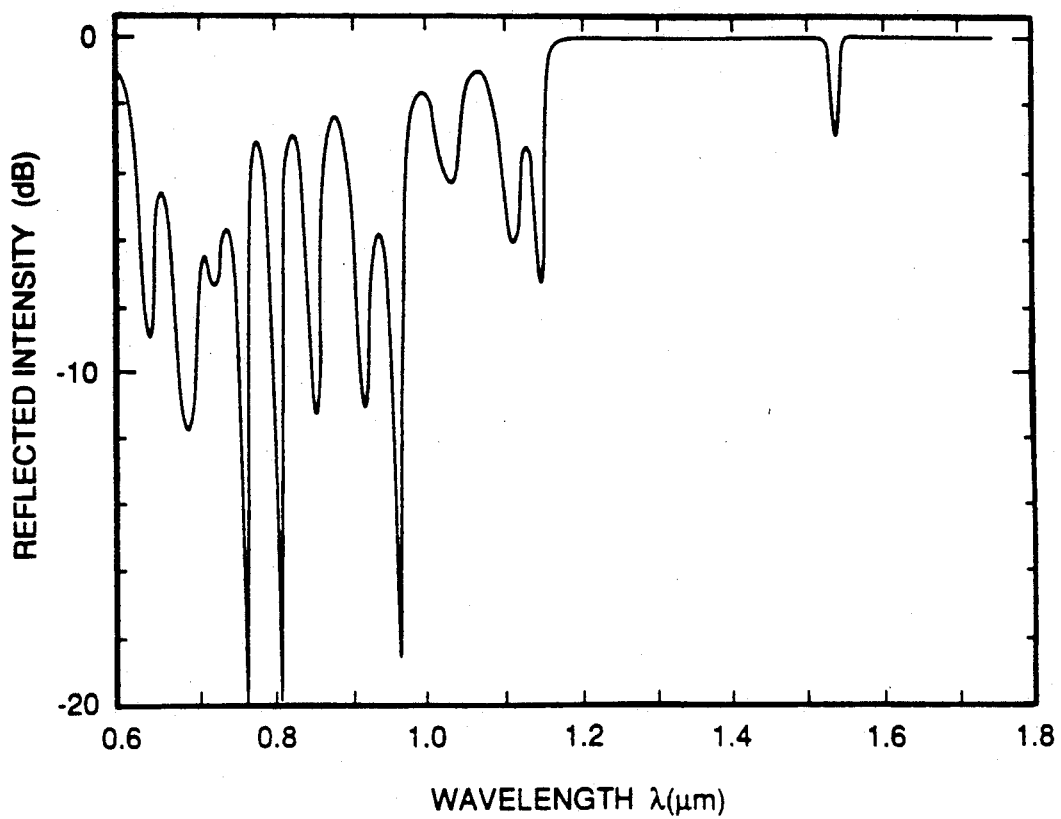
FIG. 3 is a plot of reflectivity for a wavelength range of from 0.6 to 1.8 $\mu$m of a resonant cavity with a four pairs of $Si/SiO_2$ bottom mirror, a $\lambda/2$ $SiO_2$ active region, and a 2½ pairs $Si/SiO_2$ top mirror.
Figure 4:
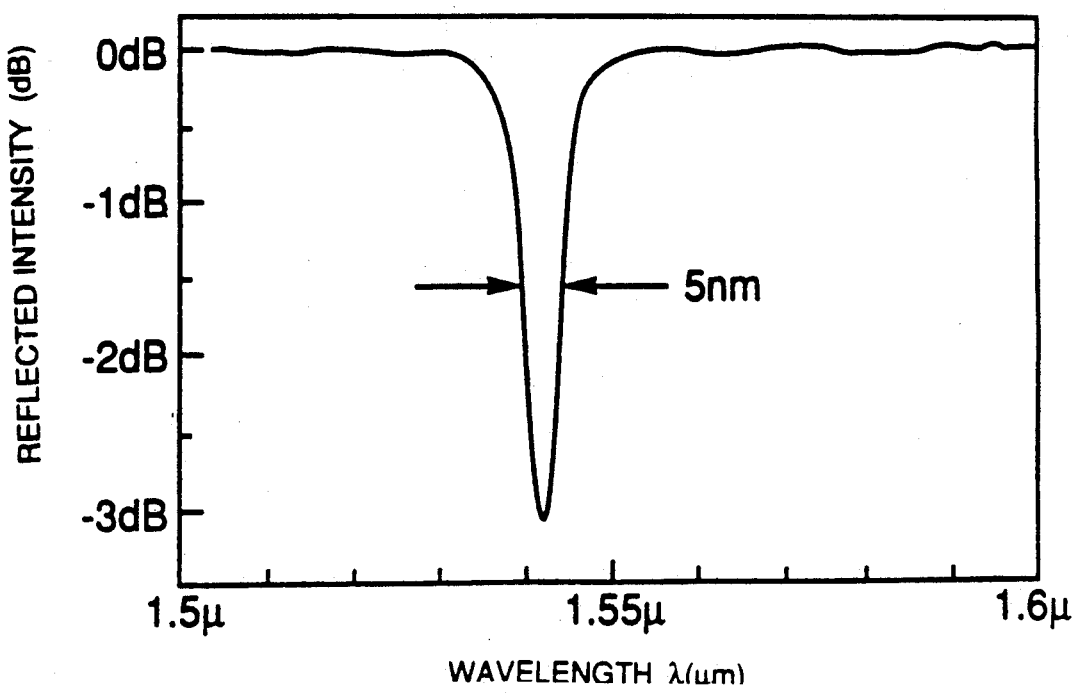
FIG. 4 is a plot of an enlarged representation of reflectivity of the resonant cavity of FIG. 3 in a wavelength range of from 1.5 to 1.6 $\mu$m.

The reflectivity spectrum of a Si/SiO$_2$ cavity is shown in FIG. 3. The reflectivity spectrum was measured using fiber-guided optics under near-normal incidence ($\theta_0 \approx 20°$) conditions. The reflectivity spectrum shown in FIG. 3 exhibits interference fringes at wavelengths <1150 nm and a very high reflectivity band for wavelengths >1200 nm. At a wavelength of approximately 1.54 μm, a dip in the reflectivity is observed indicating the resonance mode of the cavity. At resonance, the intensity transmitted through an ideal Fabry-Perot cavity approaches unity, i.e., the reflectivity is reduced. In order to obtain the desired resonance wavelength, a highly accurate control of the growth process of the mirrors and of the active region is required. Since the resonance wavelength depends linearly on the layer dimensions, a layer dimensions control of better than one percent is desirable. The transmission resonance within a range of from 1500 nm to 1600 nm is shown in greater detail in FIG. 4. The magnitude of the dip is 3 dB and its full-width at half maximum is $\Delta\lambda = 5$ nm. The cavity quality factor Q can be inferred from the width of the transmission resonance using:

$$Q = \lambda/\Delta\lambda \quad (4)$$

where λ is the wavelength of the resonance. A value of Q=310 is inferred from Equation 4. The exact location of the resonance depends on the active layer thickness as well as the phase-shifts of the wave at the two mirrors which, in turn, depends on the layer thicknesses of the two quarter-wave reflectors.

Room-temperature photoluminescence experiments were performed on the Er-doped Si/SiO$_2$ resonant cavities using excitation of 980 nm. The top mirror of some samples was removed by selective wet chemical etching on some parts of the sample. The removal of the top mirror allows direct comparisons between structures with and without a cavity.

Most of the implanted Er is located in the center SiO$_2$ layer of the cavity (see FIG. 2). The density of Er located in the top-mirror SiO$_2$ layer is less than 7 percent of the total Er density as inferred from active layer 13 thickness of 5400 Å and a calculated projected straggle of 2450 Å. Since only a small proportion of the Er is located in the top mirror, the removal of the top mirror does not significantly reduce the amount of optically active Er in the structure.

Figure 5:
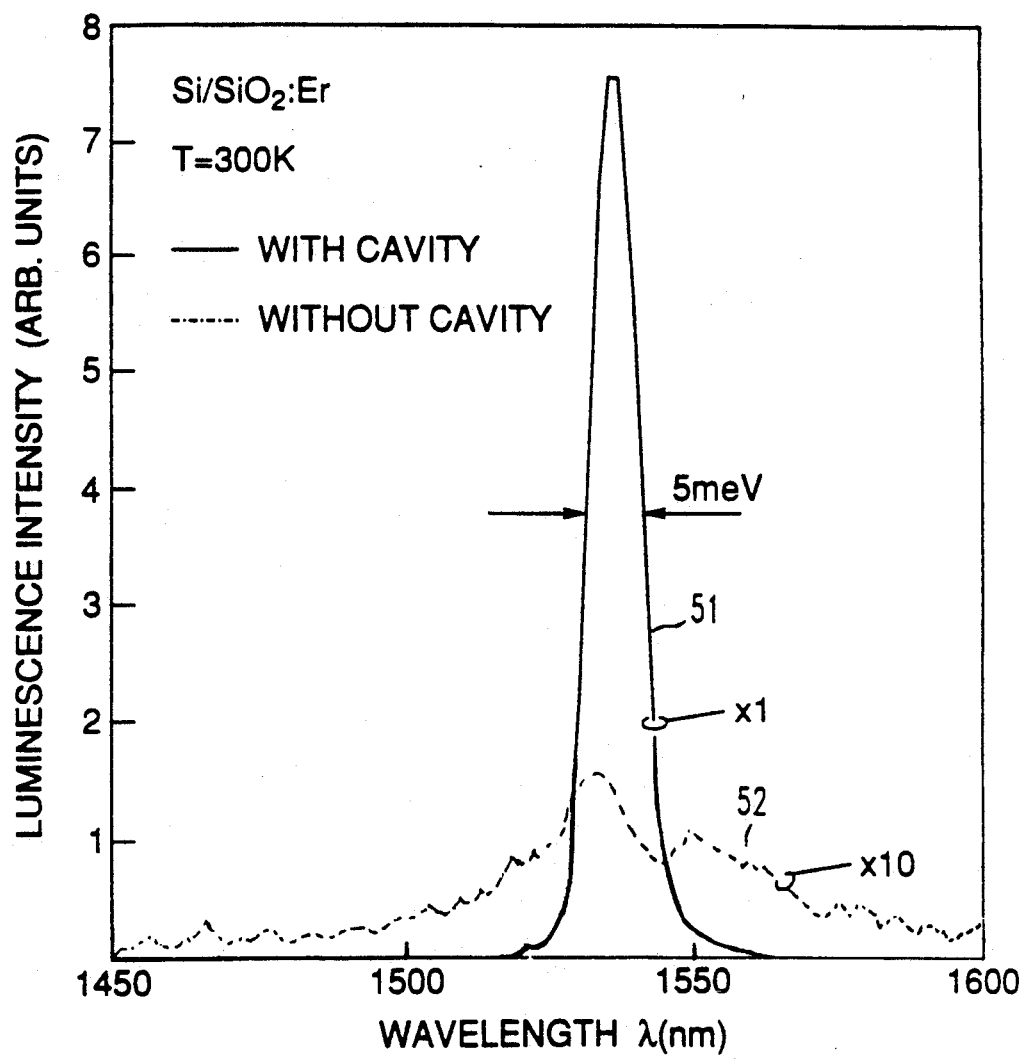
FIG. 5 is a plot of a room-temperature photoluminescence spectra of Er-implanted $SiO_2$ active region with an optical cavity (solid curve) and without an optical cavity (dot-dash curve)

The comparison of photoluminescence spectra measured at normal incidence of Er-doped SiO$_2$ structures with and without a resonant cavity is represented in FIG. 5 by curves 51 and 52, respectively. Most strikingly, the peak intensity of the resonant cavity structure is greatly enhanced as compared to the structure without a cavity. For the samples shown in FIG. 5, the increase in intensity is a factor of 50. The enhancement in intensity studied on different typically one to two orders of magnitude. The enhancement in intensity is entirely attributed to the presence of the resonant cavity and can be theoretically estimated from the finesse of the cavity. For a δ-function-like emission spectrum occurring at the resonance wavelength of the cavity, the enhancement factor is approximately the finesse of the cavity which is given by:

$$F = \frac{\pi(R_1 R_2)^{\frac{1}{2}}}{1 - \sqrt{R_1 R_2}} \tag{5}$$

Using $R_1 = 98.5$ percent and $R_2 = 99.8$ percent, the finesse is calculated to be $F \approx 370$. However, the experimental finesse is smaller than the calculated one, possibly due to thickness variations of the reflector layers which reduce the reflectivity. Furthermore, a direct comparison of the photoluminescence of the two structures is complicated by the bottom reflector of the structure without a cavity, which enhances the emission through the top by approximately a factor of two.

The change in emission intensity characteristic is not due to different excitation conditions of the structures with and without a cavity, but may be attributed entirely to the effect of the resonant cavity. First, some of the exciting light ($\lambda = 980$ nm) is absorbed in the Si layers of the top mirror. The top mirror, therefore, causes a weaker excitation of the active region in the cavity as compared to the structure without a top reflector. Second, the excitation wavelength ($\lambda = 980$ nm) is far off-resonance. Therefore, the intensity of the exciting light does not increase due to multiple reflections within the cavity.

In addition to the change in luminescence intensity, FIG. 5 also reveals a significant change in the spectral purity of the Er emission. The photoluminescence has a clean, symmetric line shape with a full-width at half-maximum of 5 me V (see curve 51). The Er emission spectrum of the structure without a cavity is broader, typically 20 me V wide, and has a double-peak structure (see curve 52). The change in spectral characteristic indicates that the near normal emission is mainly determined by the characteristics of the cavity rather than the inhomogeneously broadened emission of Er-doped SiO$_2$.

Figure 6:
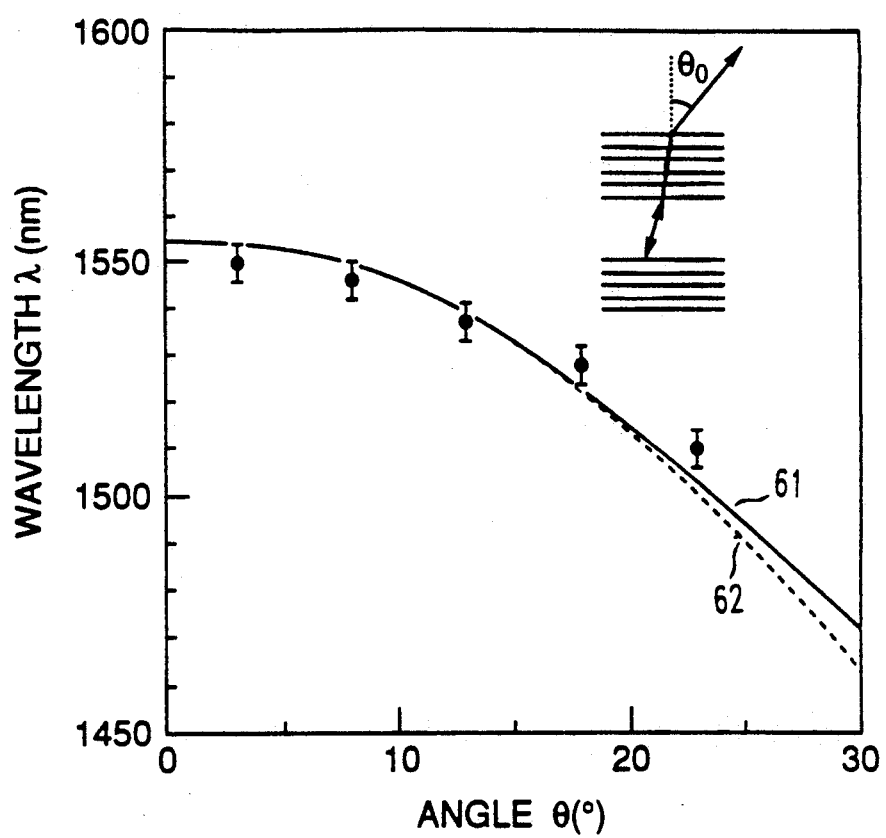
FIG. 6 is a plot of an emission wavelength of an Er-doped $Si/SiO_2$ resonant cavity as a function of an emission angle.

The spontaneous emission from the resonant cavity is strongly directed along the optical axis of the cavity. Such a directed emission is desirable in optical fiber applications for high coupling efficiencies. In order to investigate the angular dependence of the emission, photoluminescence spectra were taken for normal and off-normal directions. The emission wavelength as a function of the emission angle is shown in FIG. 6. For off-normal angles, the emission wavelength shifts to shorter wavelengths, i.e. higher energies. The shift can be understood in terms of a constant, on-resonance energy of the on-axis component of the radiation mode. Assuming a constant on-axis energy of photons, the emission wavelength in air ($n_{air} = 1$), originating from a cavity consisting of an active medium with index n and two planar (non-distributed) mirrors, can be expressed as a function of the emission angle $\theta_0$:

$$\lambda_e = \lambda_{res} \cos\left[\arcsin\left(\frac{1}{n}\sin\theta_0\right)\right] \tag{6}$$

where $\lambda_{res}$ is the resonance wavelength of the cavity, respectively. For small angles, Equation 6 can be approximated by:

$$\lambda_e \approx \left[1 - \frac{1}{2}\frac{\theta_0^2}{n^2}\right] \tag{7}$$

Equations 6 and 7 are represented in FIG. 6 for $\lambda_{res} = 1.555$ μm and n = 1.5 by the solid line, 61, and dashed line, 62, respectively. Note that Equations 6 and 7 apply to cavities with thin, coplanar mirrors. For distributed Bragg reflectors, an effective index, $n_{eff}$, must be substituted for n. For the structure discussed here, $n_{eff} > n$, which reduces the dependence of $\lambda_e$ on $\theta_0$ (as compared to Equations 6 and 7) which agrees with the trend to the experimental results. In addition to the change in wavelength, a drop in intensity is observed with increasing angle. For example, the intensity drops by a factor of 15 by changing the emission angle from 13° ($\lambda_e = 1.537$ μm) to 23V ($\lambda_c = 1.510$ μm).

Additional advantages and modifications will readily occur to those skilled in the art. Therefore, the invention in its broader aspects is not limited to the specific details, representative devices, and illustrated examples shown and described. Accordingly, various modifications may be made without departing from the spirit or scope of the general inventive concept as defined by the appended claims and their equivalents.

We claim:

1. A light-emitting device which comprises in an ascending order, a substrate, a bottom reflector mirror, an active layer, and a top reflective layer, said mirrors forming a Fabry-Perot cavity enclosing said active layer, said active layer is doped with a rare earth element selected from lanthanide series elements with numbers 57 through 71, the thickness of the active layer being a whole number multiple of λ/2 wherein λ is the operating (or emission) wavelength of the device, said number being one of the numbers ranging from 1 to 5, the fundamental mode of the cavity being in resonance with the emission wavelength of said selected rare earth element.

2. The light-emitting device of claim 1 in which said rare earth element comprises Erbium.

3. The light-emitting device of claim 1 in which said active layer comprises material selected from the group consisting of SiO$_2$, Al$_2$O$_3$, phosphosilicate glass, borosilicate glass, borophosphosilicate glass, boron aluminum silicate glass, germanate glass, tellurite glass, fluoride glass, and $Si_3N_4$.

4. The light-emitting device of claim 1 in which the material of said active layer comprises material selected from the group consisting of Si, GaAs, InP, GaInAs and GaInPAs.

5. The light-emitting device of claim 1 in which said mirrors are selected from distributed Bragg reflector (DBR) mirrors, metal mirrors, conductive oxide mirrors, and their combination so as to provide the said fundamental mode of the cavity.

6. The light-emitting device of claim 1 in which said active layer is selected from glass-like materials and tetrahedrally bonded semiconductor materials, each of said mirrors comprising a DBR mirror, the DBR mirrors consisting each of a plurality of pairs of layers, the thickness of each layer being equal to $\lambda/4$, one layer of each pair having a higher refractive index than the other, and one layer of each mirror having a certain refractive index being adjacent to the active layer having a different refractive index, which is lower than said certain refractive index, the number of pairs of layers in the bottom DBR mirror ranging from 2 to 10, and the number of pairs of layers in the top DBR mirror being smaller than the number of pairs of layers in the bottom DBR mirror and ranging from 1 to 4, and a capping layer on top of the top DBR mirror.

7. The light-emitting device of claim 1 in which the material of said layers of the DBR mirrors is selected from the group consisting of Si, Ge, $SiO_2$, $Al_2O_3$, and $TiO_2$, such that the two layers in each pair have different refractive indices.

8. The light-emitting device of claim 1 in which the material of said active layer comprises $SiO_2$.

9. The light-emitting device of claim 1 in which one layer in each pair of layers comprises $SiO_2$ and another layer in the pair comprises Si.

10. The light-emitting device of claim 1 in which the active layer comprises Si and the layers in the bottom DBR mirror begin with $SiO_2$ adjacent the substrate and end with Si adjacent the active layer, and the layers in the top DBR mirror begin with Si adjacent the active layer.

11. The light-emitting device of claim 10 in which the number of pairs of layers in the bottom DBR mirror is 4 and layers in the top mirror is 2.5 with an upper layer acting as the capping layer.

12. The light-emitting device of claim 10 in which said rare earth element comprises Erbium, and said device is capable of spontaneous photoluminescence at wavelength of approximately 1.5 $\mu$m.

13. A light-emitting device which comprises, in an ascending order, a substrate, a bottom distributed Bragg reflector (DBR) mirror, an active layer, and a top distributed Bragg reflector (DBR) mirror, said active layer being of a glass-like material doped with a rare earth element selected from lanthanide series elements with numbers 57 through 71, the thickness of the active layer being a whole number multiple of $\lambda/2$ wherein $\lambda$ is the operating wavelength of the device, said number being one of the numbers ranging from 1 to 5, said DBR mirrors consisting each of a plurality of pairs of layers, the thickness of each layer being equal to $\lambda/4$, one layer of each pair having a higher refractive index than the other, and one layer of each mirror having a certain refractive index being adjacent to the active layer having a different refractive index, the number of pairs of layers in said bottom DBR mirror ranging from 2 to 10, and the number of pairs of layers in said top DBR mirror being smaller than the number of pairs of layers in the bottom DBR mirror and ranging from 1 to 4, and a capping layer on top of the top DBR mirror.

14. The light-emitting device of claim 13 in which the material of said active layer comprises material selected from the group consisting of silicon dioxide, aluminum oxide, phosphosilicate glass, borosilicate glass, borophosphosilicate glass, germanate glass, tellurite glass, fluoride glass, and $Si_3N_4$.

15. The light-emitting device of claim 14 in which the material of said active layer comprises material selected from the group consisting of Si, GaAs, InP, GaInAs and GaInPAs.

16. The light-emitting device of claim 13 in which said rare earth element comprises Erbium.

17. The light-emitting device of claim 13 in which the material of said active layer comprises $SiO_2$.

18. The light-emitting device of claim 13 which the material of said layers of said DBR mirrors is selected from the group consisting of Si, Ge, $SiO_2$, $Al_2O_3$, and $TiO_2$, such that the two layers in each pair have different refractive indices.

19. The light-emitting device of claim 13 in which one layer in each pair of layers comprises $SiO_2$ and another layer in the pair comprises Si.

20. The light-emitting device of claim 13 in which the active layer comprises $SiO_2$, the layers in said bottom DBR mirror being with $SiO_2$ adjacent the substrate and end with Si adjacent the active layer, and the layers in said top DBR mirror begin with Si adjacent the active layer.

21. The light-emitting device of claim 20 in which the number of pairs of layers in the bottom DBR mirror is 4.

22. The light-emitting device of claim 20 in which the number of pairs of layers in the top mirror is 2.5 with an upper layer acting as the capping layer.

23. The light-emitting device of claim 13 in which said rare earth element comprises Erbium, and said device is capable of spontaneous photoluminescence at wavelength of approximately 1.5 $\mu$m.

24. A light-emitting device which comprises, upon a substrate, a bottom reflector mirror, an active layer and a top reflective mirror, said active layer is doped with Erbium, the thickness of the active layer being a whole number multiple of $\lambda/2$, wherein $\lambda$ is the operating wavelength of the device, said number being one of numbers ranging from 1 to 5, the fundamental mode of the cavity being in resonance with the emission wavelength of erbium.

25. The light-emitting device of claim 24 in which the material of said active layer comprises $SiO_2$.

26. The light-emitting device of claim 24 in which each of said mirror is a distributed Bragg reflector mirror consisting each of a plurality of pairs of layers, one layer of each pair having a higher index of refraction than the other layer of the pair, the thickness of each layer being $\lambda/4$, the number of pairs of layers in one DBR mirror ranging from 2 to 10, and the number of pairs of layers ranging from 1 to 4.

27. The light-emitting device of claim 26 in which one layer in each pair of layers comprises $SiO_2$ and another layer in each pair comprises Si.

28. The light-emitting device of claim 27 in which the material of the active layer comprises $SiO_2$, the bottom DBR mirror has 4 pairs of layers and the top DBR mirror has 2.5 pairs of layers with the uppermost layer of the top mirror acting as a capping layer.

* * * * *